United States Patent
Wang

(10) Patent No.: US 8,849,846 B1
(45) Date of Patent: Sep. 30, 2014

(54) MODIFYING SEARCH CRITERIA USING GESTURES

(75) Inventor: Henry Shyue-yeong Wang, Mountain View, CA (US)

(73) Assignee: Intuit Inc., Moutain View, CA (US)

(*) Notice: Subject to any disclaimer, the term of this patent is extended or adjusted under 35 U.S.C. 154(b) by 279 days.

(21) Appl. No.: 13/193,420

(22) Filed: Jul. 28, 2011

(51) Int. Cl.
*G06F 17/30* (2006.01)
(52) U.S. Cl.
CPC .................. *G06F 17/30345* (2013.01)
USPC ............................................ 707/766
(58) Field of Classification Search
CPC .............. G06F 17/30; G06F 17/30345; G06F 17/30598
USPC ................... 707/766, 759, 999.004, 999.005, 707/E17.061
See application file for complete search history.

(56) References Cited

U.S. PATENT DOCUMENTS

| | | | |
|---|---|---|---|
| 7,593,000 B1* | 9/2009 | Chin | 345/156 |
| 2002/0138479 A1* | 9/2002 | Bates et al. | 707/5 |
| 2005/0057524 A1* | 3/2005 | Hill et al. | 345/173 |
| 2006/0265361 A1* | 11/2006 | Chu | 707/3 |
| 2007/0038616 A1* | 2/2007 | Guha | 707/4 |
| 2011/0289456 A1* | 11/2011 | Reville et al. | 715/830 |
| 2012/0089582 A1* | 4/2012 | Kumar et al. | 707/706 |
| 2012/0166470 A1* | 6/2012 | Baumgaertel et al. | 707/769 |
| 2012/0185801 A1* | 7/2012 | Madonna et al. | 715/834 |

\* cited by examiner

*Primary Examiner* — Shiow-Jy Fan
(74) *Attorney, Agent, or Firm* — Osha Liang LLP

(57) ABSTRACT

A method for searching using a touchscreen including: receiving, from a user, multiple search criteria; receiving, using the touchscreen, a gesture input from the user; selecting a search preference corresponding to the gesture input; obtaining multiple modified search criteria by modifying the plurality of search criteria based on the search preference; and generating multiple search results based on the multiple modified search criteria and a data repository.

13 Claims, 6 Drawing Sheets

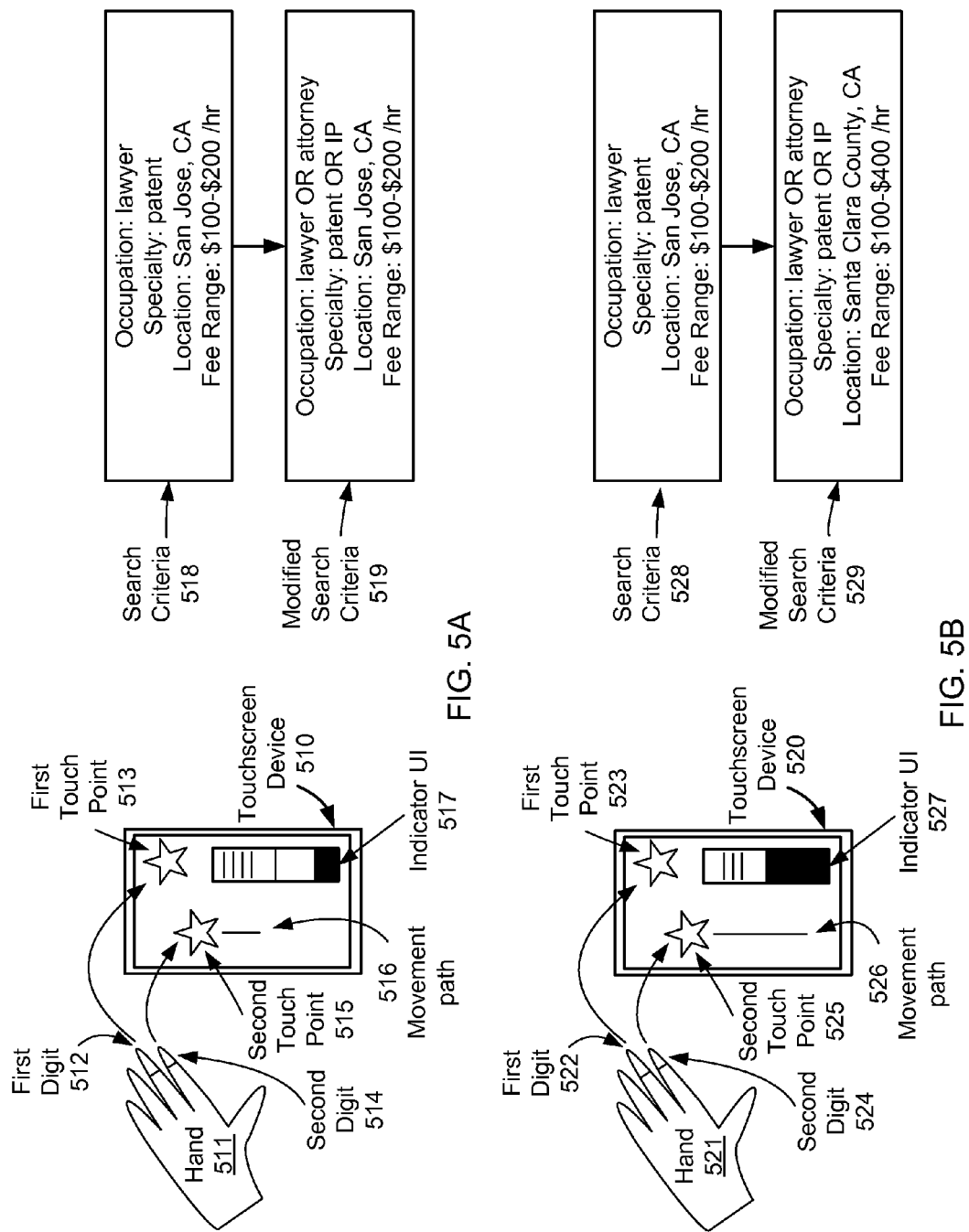

MODIFYING SEARCH CRITERIA USING GESTURES

BACKGROUND

Touchscreen devices have recently become widely used by consumers, business employees, and other users. Touchscreen devices are able to detect user input through touch. In general, a user touches a touchscreen of the touchscreen device with his/her finger or with a stylus in order to interact with the touchscreen device. This way, touchscreen devices allow a user to interact directly with the content on the touchscreen (e.g., windows, graphics, text, etc.) without using other input devices such as a keyboard or a mouse. Examples of touchscreen devices include tablet computers, mobile phones, video game devices, global positioning system (GPS) navigation devices, personal data assistants (PDAs), watches, interactive displays, and other electronic devices with a touchscreen.

With the advent of the Internet and large storage servers (e.g., standalone server racks or multiple computers connected via the Internet to form a "cloud"), very large data repositories storing over a petabyte (i.e., 1000 terabytes) of data have become commonplace (e.g., web databases, financial databases, video/audio databases, etc.). Searching and indexing such large data repositories is intrinsically more complex than searching and indexing smaller data repositories. Consequently, various methods and services (e.g., database computer languages, Internet search engines) were developed to help users obtain relevant results when searching a large data repository. Usually, a user enters a search query and other search criteria (e.g., search terms, search location, keywords, logical functions, and other possible criteria) to determine the content to be searched and the broadness (e.g., scope, specificity, etc.) of the search (i.e., how specific the search results should be to the search query). On the one hand, if the search is too broad, the search results may be mostly irrelevant. The user would then have difficulty finding relevant results among the mostly irrelevant search results. On the other hand, if a search is too narrow, the search results might be incomplete (i.e., the search results might not contain all possible relevant results stored on the data repository being searched). A user may be either unfamiliar with search query features such as Boolean operators, wildcards, special keywords, and other advanced features used in search queries or he/she may find it too cumbersome to use these features to control the broadness of a search. Therefore, a simple and intuitive method for obtaining broader or narrower search results to a search query is needed.

SUMMARY

In general, in one aspect, the invention relates to a method for searching using a touchscreen. The method comprises: receiving, from a user, a plurality of search criteria; receiving, using the touchscreen, a gesture input from the user; selecting a search preference corresponding to the gesture input; obtaining a plurality of modified search criteria by modifying the plurality of search criteria based on the search preference; and generating a plurality of search results based on the plurality of modified search criteria and a data repository.

In general, in one aspect, the invention relates to a non-transitory computer readable storage medium comprising instructions for searching using a touchscreen. The instructions comprise functionality for: receiving, from a user, a plurality of search criteria; receiving, using the touchscreen, a gesture input from the user; selecting a search preference corresponding to the gesture input; obtaining a plurality of modified search criteria by modifying the plurality of search criteria based on the search preference; and generating a plurality of search results based on the plurality of modified search criteria and a data repository.

In general, in one aspect, the invention relates to a system for searching The system comprises: a touchscreen configured to obtain a gesture input from a user; a gesture mapping module configured to identify a search preference from the gesture input; a search criteria modification module configured to generate a plurality of modified search criteria by modifying the plurality of search criteria based on the search preference; and a search module configured to generate a plurality of search results based on the plurality of modified search criteria and a data repository.

Other aspects of the invention will be apparent from the following description and the appended claims.

BRIEF DESCRIPTION OF DRAWINGS

FIGS. 4A, 4B, 5A, and 5B show examples in accordance with one or more embodiments of the invention.

DETAILED DESCRIPTION

Figure 1:
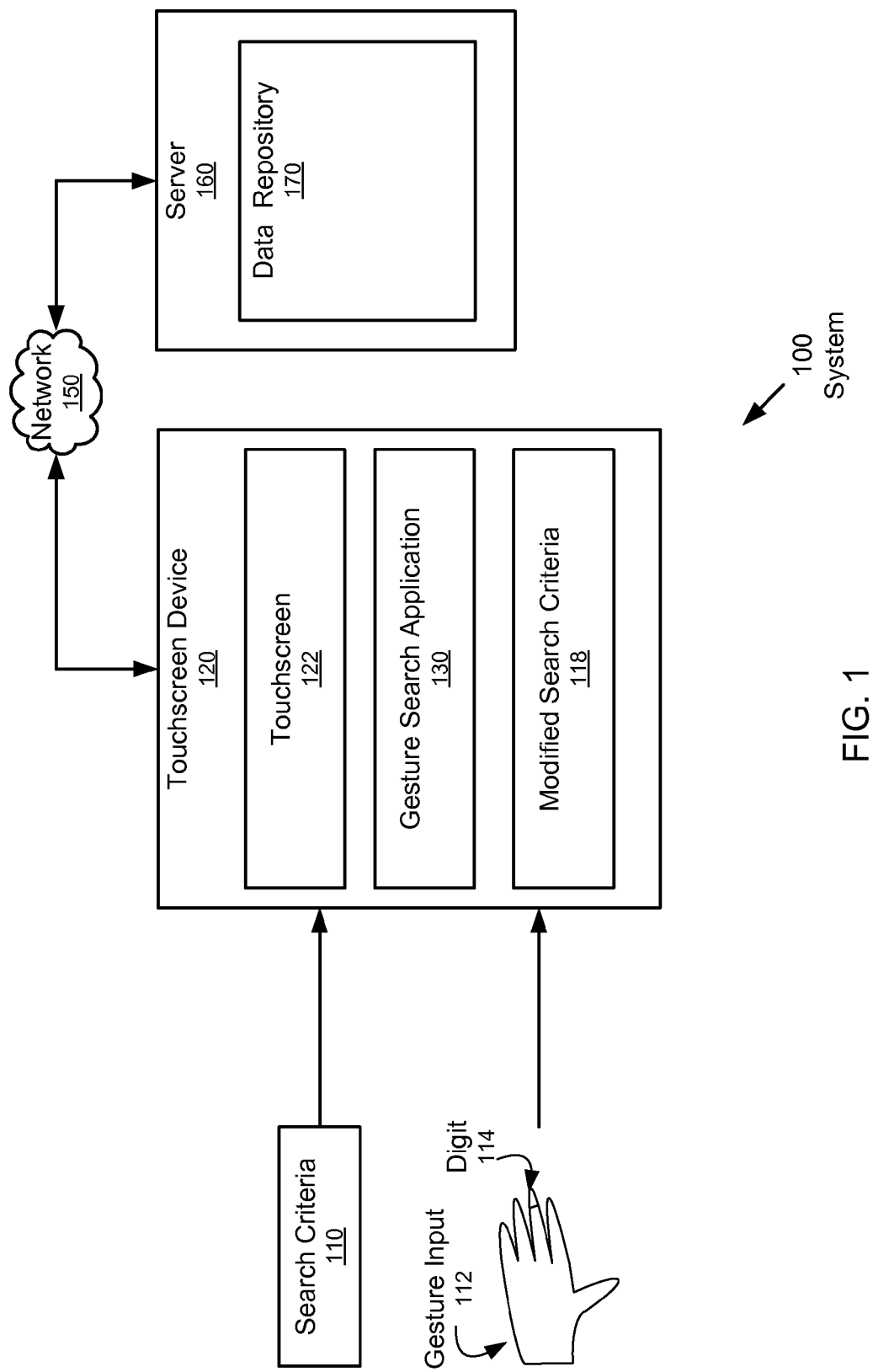
FIGS. 1 and 2 show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to assist a user of a touchscreen device (e.g., mobile phone with a touchscreen) in searching a data repository (e.g., the world wide web via the Internet). Specifically, the user may input search criteria (e.g., keywords, names, addresses, and other search terms) and may initiate the search with a gesture (e.g., a tap with one or more fingers on the touchscreen, a movement of one or more fingers across the touchscreen, and any other gesture compatible with a touchscreen device). The gesture is matched to search preferences stored on the device that are used to modify the search criteria (e.g., make the search broader by removing or adding portions of the search criteria, make the search narrower by limiting the scope of the search to only a portion of the data repository, make the search more relevant to the user by incorporating user information into the search criteria). The user may also download and customize the possible recognizable gestures and the corresponding search preferences. This allows the user to configure a touchscreen device to quickly and efficiently initiate and modify a search in order to obtain relevant and complete search results.

FIG. 1 shows a system (100) in accordance with one or more embodiments of the invention. As shown in FIG. 1, the system (100) includes a touchscreen device (120) that has a touchscreen (122) and is connected, via a network (e.g., network (150)) to a server (160) hosting a data repository (170) that is to be searched. The touchscreen device (120) may receive, as input, search criteria (110) and a gesture input (112) from a user. In one or more embodiments of the invention, the touchscreen device (120) stores and executes a gesture search application (130) that modifies the search criteria (110) based on the gesture input (112) to generate modified search criteria (118). The modified search criteria (118) may then be used for a search of the data repository (170) and the search results may be displayed on the touchscreen (122).

In one or more embodiments of the invention, search criteria are criteria used in a search of a data repository (e.g., 170) that determine what content is searched in the data repository, how the data repository is searched, what search results are selected and displayed, and how the results are selected and displayed. Generally speaking, search criteria may include search queries, search terms, keywords, delimiters, logical functions, inclusions, exclusions, exceptions, restrictions, priority levels and weights, file types, dates, categories, fields, numbers, and other criteria. Searches for individuals, professionals, businesses, and other organizations may include search criteria such as names, addresses, geographical location, occupation, industry, and other search criteria relevant to such searches. Search criteria may include options for limiting the search to only a portion of a data repository (e.g., 170), such as searching only certain domains of websites, certain sections of a directory, certain portions of a physical disk drive, and other scope limitations. Search criteria may include a language specification so that the search is limited only to text in a particular language. Search criteria may also modify how the results are displayed (e.g., by filtering search results with display filters, by including annotations, by determining how many results are displayed, by changing how results are ranked, and other search result modifications). Search criteria may include a user's previous search history, a user's browsing history, or a user's global search preferences, and any other user information to further modify the search criteria. Generally speaking, searching is not limited to text, and thus search criteria may include identifiers, entire copies, or portions of pictures, videos, audio recordings, and any other data formats that include non-text data. Search terms, keywords, and other search criteria may also be preprocessed (e.g., by natural language processing software running on a processor) or simply rearranged prior to initiating the search. Those skilled in the art, having the benefit of this detailed description, will appreciate that search criteria are not limited to those described above and that many other search criteria exist.

In one or more embodiments of the invention, a gesture input (112) is a signal resulting from an interaction between one or more digits (114) of a user and the touchscreen (122). The gesture input (112) can be stored and/or represented in software or hardware (e.g., using various data structures such as arrays, lists, trees, hash tables, etc.). In one or more embodiments of the invention, gesture input (112) includes tactile information that represents a location of the touchscreen (e.g. pixels on the touchscreen (122) represented in Cartesian coordinates, spherical coordinates, or polar coordinates) that was touched by the one or more digits (114) of the user. The tactile information may include other parameters, such as pressure of the touch, temperature of the touching object, opacity and color of the touching object, and any other information that can be obtained by the touchscreen (122). In one or more embodiments of the invention, the tactile information of the gesture input (112) may be represented in any software or hardware data format (e.g., an array of numbers, where each number represents a pressure of the touch and corresponds to a pixel on the touchscreen). The gesture input (112) may either be raw data from sensors in the touchscreen (122) or may have underwent signal processing (e.g., amplification, filtering, and other signal processing functions) by another application (e.g., operating system of the touchscreen device, drivers of the touchscreen device, and other software and hardware components of the touchscreen device) to remove background noise and any other artifacts detrimental to proper touch identification. In one or more embodiments of the invention, the gesture input (112) may include tactile information from multiple digits (114) of a user. In one or more embodiments of the invention, the gesture input (112) refers to the actual gesture performed by the user (i.e., the physical gesture prior to being encoded in computer readable format).

In one or more embodiments of the invention, a digit (114) is a user's finger, hand, ear, and/or any other body part suitable for interacting with the touchscreen (122). A digit (114) may also be a stylus or any other object that can be held or controlled by the user in order to interact with the touchscreen (122). In one or more embodiments of the invention, one or more digits (114) are used to make a gesture on the touchscreen (122). Generally speaking, a gesture may be any identifiable interaction with the touchscreen (122) via touch that may trigger some action to be taken by the touchscreen device (120). For example, a single touch with a finger may be a gesture that indicates a window on the touchscreen (122) was clicked. In another example, a more complex gesture may be a simultaneous touch with two or more fingers that results in a change of one or more preferences in a software program running on the touchscreen device (120). A simultaneous touch may refer to a touch occurring with two or more digits (114) essentially at the same time (e.g., a first digit touches the touchscreen at most one second prior to a second digit) or, alternatively, a simultaneous touch may refer to a touch where two or more digits are touching the touchscreen (122) at the same time, regardless of how far apart in time one digit touched the touchscreen (122) before the other. Another example of a gesture may be a touch with one finger while another finger slides or moves across the touchscreen (122) by a certain distance and in a certain direction (i.e., the user traces a vector on the touchscreen), where the direction may determine the action to be taken and the distance may determine the extent or scale of this action. In yet another example, a gesture may include the user drawing geometric shapes, letters, words, or other patterns with one finger on the touchscreen, where the drawn pattern may determine the action to be taken. Those skilled in the art, having the benefit of this detailed description will appreciate that many other gestures exists that may be uniquely identified by a touchscreen device (120) and such gestures trigger many other actions compatible with a touchscreen device (120).

In one or more embodiments of the invention, a touchscreen device (120) is any electronic device that has a touchscreen (122). As discussed above, a touchscreen device (120) may be a tablet computer, a mobile phone, a video game device, a GPS navigation device, a PDA, a watch, an interactive display, or any other electronic device that has a touchscreen. A touchscreen device (120) may include any combination of hardware components (e.g., a processor, a graphics processing unit (GPU), a network processing unit (NPU), a multi-core processing unit (MPU), random access memory (RAM), flash memory, a radio, a display, input devices, etc.) and software components (e.g., operating systems, applications, browsers, libraries, data structures, etc.). A touchscreen (122) is a digital or analog display (e.g., LCD display, plasma display, CRT display) that is capable of sensing physical contact or near physical contact with a physical object (e.g., pressure, force, proximity of a digit, change in capacitance, change in resistance, etc.) on its surface and thus is capable of detecting touch with a digit (114). The touchscreen (122) may be developed using any compatible sensing technology, such as resistive sensor technology, capacitive sensor technology, surface acoustic wave sensor technology, and any other technology capable of detecting touch. As discussed above, in one or more embodiments of the invention, a user interacts (i.e., touches, presses, brushes, slides over, or uses any other motion with a digit (114)) on a touchscreen (122) to modify the search criteria (110) used for the search of the data repository (170).

In one or more embodiments of the invention, the gesture search application (130) includes any combination of software and software components (e.g., data structures, algorithms, procedures, libraries, modules, interfaces, frameworks, applets, web applications, mobile applications, browsers, operating systems, etc.). The gesture search application (130) takes as input the search criteria (110) and the gesture input (112) entered by the user and modifies the search criteria (110) to generate modified search criteria (118). The gesture search application (130) may change any of the search criteria (110) described above in response to receiving a particular gesture input (112). For example, if a user initiates a search by touching the touchscreen simultaneously with two fingers, the search criteria (110) may be modified to generate modified search criteria (118) that result in a broader search. Generally speaking, a broader search may return more search results than a narrower search. One way of obtaining a broader search is by removing some search terms that are part of the search criteria (110). For example, if search criteria (110) includes a search query "Ethan AND Hunt AND patent AND IP AND attorney" and the search query is modified to "Ethan AND Hunt AND attorney", more search results will be received because it is not longer necessary for search results to contain the terms "IP" and "patent" to satisfy the search query. Conversely, a broader search may also be obtained by including additional search criteria. For example, if search criteria (110) includes a search query "Ethan AND Hunt AND patent AND attorney" and the search query is modified to "Ethan AND Hunt AND (patent OR IP) AND (attorney OR lawyer)", more search results will be obtained because for certain search terms (i.e., patent and attorney) alternative terms were added (i.e., IP and lawyer, respectively). Thus, data repository entries matching the alternative terms will also be included in the search results. Those skilled in the art, having the benefit of this detailed description will appreciate that similar means can be used to narrow a search (i.e., return fewer search results). Other examples of the functionality of the gesture search application (130) are provided below.

In one or more embodiments of the invention, the server (160) is a computer system (e.g., one or more mainframes, computer farms, laptops, personal digital assistants (PDA), desktop personal computers (PC), etc.). The server (160) may host the data repository (170) that is to be searched. The data repository may include any combination of hardware (e.g., one or more magnetic disk drives, flash, Random-Access Memory (RAM), etc.) and software (e.g., database systems). In one or more embodiments of the invention, the data repository (170) is stored, either in part or completely, on multiple servers and/or on the touchscreen device (120). In one or more embodiments of the invention, the network (150) connecting the touchscreen device (120) to the server (160) is any electronic connection, including standard Wi-Fi, Ethernet, USB, firewire, or any other data connection protocol. In one or more embodiments of the invention, the data repository (170) stores data in digital format (e.g., 0's and 1's in a memory, hard disk, flash, or any other storage) that may be encoded or represented in any file format (e.g., text, pdf, spreadsheet format, html, xml, image format, video format, audio format, and other any other file format). The data repository (170) may be a directory of people, a database of products, a database of financial information, a database of business information, a database of technical information, and any other database. In one or more embodiments of the invention, the data repository (170) may include the entire world-wide web stored on multiple servers across the world or stored, in indexed form, in one or more servers of a search engine provider or other institution.

Figure 2:
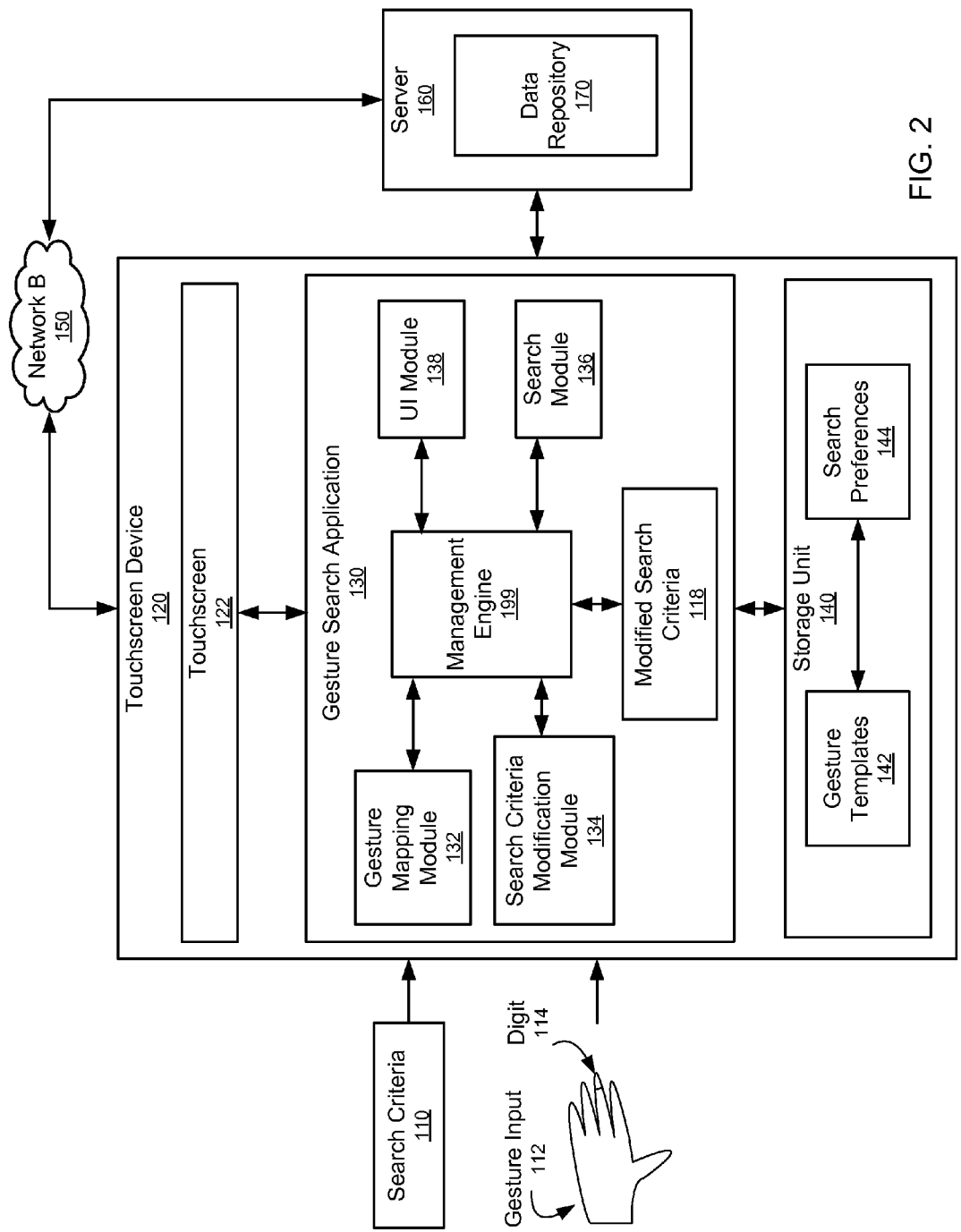

As shown in FIG. 2, the gesture search application (130) includes a gesture mapping module (132), a search criteria modification module (134), a search module (136), and a user interface (UI) module (138), in accordance with one or more embodiments of the invention. The touchscreen device (120) also includes a storage unit (140) (e.g., one or more magnetic disk drives, flash, Random-Access Memory (RAM), etc.) that stores gesture templates (142) and search preferences (144), in accordance with one or more embodiments of the invention. In one or more embodiments of the invention, any one component or any one part of a component of the gesture search application (130) and any data stored in the storage unit (140) is stored or executed elsewhere (e.g., on a remote server (not shown), on a server (e.g., 160), or any other device). Likewise, one or more of the components shown in FIG. 2 may be combined to operate as a single component. Each component of the gesture search application (130) and each item stored in the storage unit (140) is discussed below.

In one or more embodiments of the invention, gesture templates (142) include predefined or dynamically generated sets of tactile information that can be matched to the gesture input (112) to trigger an action to be performed by the touchscreen device (120) as a result of a positive match. As described above, tactile information may be any software or hardware data format (e.g., arrays, lists, trees, hash tables, etc.) suitable for encoding a touch on the touchscreen, including the touch pressure, touch duration, and any other relevant touch parameters as described above. A gesture template may include a tactile information pattern or a set of rules defining a tactile information pattern that is checked against the gesture input (112) to determine if the gesture input (112) matches the pattern. For example, a gesture template may identify a simultaneous press with two fingers anywhere on the touchscreen (122) using a pattern identifying two distinct regions on the touchscreen (122) exhibiting detectable pressure or detectable proximity of a digit (114) to the touchscreen (122). Subsequently, any gesture input (112) that identifies pressure or proximity in two distinct regions of the touchscreen (122) (e.g., coming from a gesture of a simultaneous touch with two digits), no matter what the location of those regions are on the touchscreen (122), may match the pattern and therefore match the aforementioned gesture template. Gesture templates (142) stored in the touchscreen device (120) may be created and modified by the user. For example, a user may create a gesture template by entering a programming sequence of the gesture search application (130) and subsequently performing a desired gesture using the touchscreen (122) that will then be stored as a gesture template or part of a gesture template. In one or more embodiments, gesture templates (142) can be downloaded from a touchscreen device manufacturer, a third party provider, and any other entity as part of a patch, an upgrade, a mobile application, and other software application or portion of a software application.

In one or more embodiments of the invention, the search preferences (144) are predefined or dynamically generated rules that can be stored in any software or hardware data format (e.g., arrays, lists, trees, hash tables, etc.) and are used to modify the search criteria (110). Search preferences (144) may be mapped to gesture templates (142), and thus a particular gesture input (112), upon being matched to a gesture template, may trigger a certain search preference to be applied to the search criteria (110) to generate the modified search criteria (118). Search preferences (144) may include any modification to any of the search criteria (110) described above. For example, a search preference may include instructions to remove a first name of a person from search criteria (110) that are used for searching a directory of people. In this example, a certain gesture (e.g., simultaneous two finger touch) may trigger this search preference to be applied to the search criteria (110). In one or more embodiments of the invention, a gesture template may be mapped to multiple search preferences and a search preference may be mapped to multiple gesture templates.

Continuing with FIG. 2, in one or more embodiments of the invention, the gesture mapping module (132) includes any combination of software and software components (e.g., data structures, algorithms, procedures, libraries, modules, interfaces, frameworks, applets, web applications, mobile applications, browsers, operating systems, etc.). The gesture mapping module (132) takes a gesture input (112), matches it with one or more gesture templates (142), and maps the one or more gesture templates (142) to one or more search preferences (144), in accordance with one of more embodiments of the invention. The gesture mapping module may identify which gesture templates (142) best match the gesture input (112) by checking each of the stored gesture templates (142) to verify which, if any, are a sufficient match. If none of the gesture templates (142) match the gesture input (112), the gesture mapping module (132) may ignore the gesture input (112) or may output an alert to be displayed on the touchscreen (122) identifying that no matching gesture template was found. In one or more embodiments of the invention, the management engine (199) operatively connects the gesture mapping module (132), the search criteria modification module (134), the modified search criteria (118), the search module (136), and the UI module (138).

In one or more embodiments of the invention, the gesture mapping module (132) select a gesture template based on the number of digits in the gesture input (112) that simultaneously touch the touchscreen (122). The corresponding selected search preference modifies the search criteria (110) based on the number of digits. For example, the more digits that are used in the gesture input (112), the broader the modified search criteria (118) may become and thus the broader the search may be (i.e., the search may return more search results with three digits than with a touch with two digits). In one or more embodiments of the invention, the gesture mapping module (132) selects a gesture template based on a touch with a first digit followed by a movement of a second digit along the touchscreen (122) for a certain distance and in a certain direction (i.e., the user traces a vector on the touchscreen). The corresponding search preference modifies the search criteria based on the distance and direction of the vector. For example, the further the second digit is moved along the screen, the broader or narrower the modified search criteria (118) may be. Those skilled in the art will appreciate that the touch with the first digit in the example above may be omitted.

In one or more embodiments of the invention, the gesture mapping module (132) select a gesture template based on the pressure of one or more digits. The corresponding search preference modifies the search criteria (110) based on the pressure and, optionally, based on the number of digits used. In one or more embodiments of the invention, the gesture mapping module (132) selects one or more gesture templates (142) matching a sequence of touches in time (e.g., a double click, a triple click, and any other temporal sequence of clicks, movements, and other gestures) with one or more digits. The corresponding modifications to the search criteria (110) are based on the number of touches, the number of digits used, the time between consecutive touches, the time or duration one or more digits are in contact with the touchscreen (122), and any other parameters that can be identified from a sequence of touches. In one or more embodiments of the invention, the gesture mapping module (132) selects one or more gesture templates (142) matching a gesture that has a particular pattern, (e.g., geometric symbol, letter, word, drawing, and any other pattern). The corresponding search preference and resulting modifications to the search criteria (110) are based on that pattern. Those skilled in the art, having the benefit of this detailed description, will appreciate that many other possible gestures, gesture inputs (112), and corresponding gesture templates (142) exist and may be applied to any of the embodiments of this invention.

In one or more embodiments of the invention, the search criteria modification module (134) includes any combination of software and software components (e.g., data structures, algorithms, procedures, libraries, modules, interfaces, frameworks, applets, web applications, mobile applications, browsers, operating systems, etc.). The search criteria modification module (134) takes one or more search preferences (144) and modifies the search criteria (110) provided by the user to obtain modified search criteria (118), in accordance with one or more embodiments of the invention. The search criteria modification module (134) may add, modify, or remove any portions or sections of the search criteria (110) described above. In one example, the search criteria modification module (134) may modify the inputted search terms in the search criteria (110) to include synonyms of the inputted search terms, morphological forms of the inputted search terms, common misspellings of the inputted search terms, and other similar terms. For example, the search query "auto sale" may be modified to "auto sale OR car sale", as the word "car" is a synonym for "auto", and thus the resulting search may return search results including either the term "auto sale" or the term "car sale". In another example, the search criteria modification module (134) may modify the search criteria (110) to limit the scope of the search to a particular portion of the data repository. For example, a search of the world-wide web may be limited to the websites in the ".edu" domain, and thus sites ending with ".com" or ".gov" may be excluded from the search. In another example, the search criteria modification module (134) may modify the search criteria to filter some of the search terms. For example, a search query "doctor AND physician AND Connor AND neurologist" may be filtered to obtain a modified search query "Connor AND neurologist". In another example, the search criteria modification module (134) may modify the search criteria (110) based on the search history of the user, a set of predetermined preferences of the user, a set of preferences of a other users in a social network of the user, or any other user information data items. For example, the touchscreen device (120) may access a social network profile of the user and compile preferences of the user's friends to find that the user's friends enjoy fishing. As a result, search criteria (110) including the search query "hook" may be modified to rank or place search results pertaining to fish hooks first and before other search results including the term "hook". In another example, the search criteria modification module (134) may modify an address or a location that is part of the search criteria (110). For example, if a user includes a complete address as well as a partial name or full name of a restaurant, one or more portions of the address (e.g., the street number) may be removed to effectively broaden the search to a larger location. In another example, the search criteria modification module (134) may modify the weights of one or more search terms in the search criteria (110). For example, if a search query is "good patent attorney", the search terms "patent" and "attorney" may receive a higher weight than the broad search term "good". In this example, a search preference may also identify the word "good" as a keyword and accordingly modify the search criteria to retrieve search results including rankings and reviews involving the search terms "patent" and "attorney". In another example, the search criteria modification module (134) may modify a range of values included in the search criteria (110). For example, a search for a laptop computer priced between $300-$400 may be modified to a search for a laptop computer priced between $300-$600.

In one or more embodiments of the invention, the search criteria (110) includes one or more characteristics (e.g., profession, first name, last name, middle name, location, telephone number, industry, income level, age, race, ethnicity, etc.) to identify a person or persons. In one or more embodiments of the invention, the search criteria (110) includes one or more business characteristics (e.g., industry, business name, location, number of employees, revenue, profit, market capital, type, strategy, etc.) to identify a business or businesses. In one or more embodiments of the invention, the search criteria (110) includes one or more product characteristics (e.g., product function, service type, cost, brand, location, availability, etc.) to identify a product/service. For example, if the search criteria (110) include search terms for a Company A smart phone, the search criteria (110) may be broadened to search for Company A cell phones and smart phones, all smart phones, or all cell phones and smart phones. In one or more embodiments of the invention, depending on the gesture input (112), the search criteria modification module (134) may leave the search criteria (110) unmodified (i.e., the modified search criteria (118) are the same as the search criteria (110)).

In one or more embodiments of the invention, the search module (136) includes any combination of software and software components (e.g., data structures, algorithms, procedures, libraries, modules, interfaces, frameworks, applets, web applications, mobile applications, browsers, operating systems, etc.). The search module (136) initiates a search of the data repository (170) with the modified search criteria (118), in accordance to one or more embodiments of the invention. The search module (136) may be a part of a database management system that includes all the functionality necessary to perform the search of the data repository (170). In one or more embodiments of the invention, the search module (136) simply forwards the modified search criteria (118) to the data repository (170) or external database system performing the search of the data repository (170). In one or more embodiments of the invention, the search module (136) includes/accesses and internet search engine.

In one or more embodiments of the invention, the UI module (138) includes any combination of software and software components (e.g., data structures, algorithms, procedures, libraries, modules, interfaces, frameworks, applets, web applications, mobile applications, browsers, operating systems, etc.). The UI module (138) is used to display one or more GUI widgets (e.g., text, images, windows, borders, scroll bards, indicators, drop-down menus, templates, etc.) displayable items on the touchscreen (122) to allow the user to interact with the gesture search application (130). In one or more embodiments of the invention, the UI module (138) is configured to display a matching gesture template and/or the mapped search preference after a gesture input (112) is received. The UI module (138) may display a confirmation window or other display item for the user to verify that the matched gesture template and the selected search preference correspond to the user's intentions. The user may cancel the search if the search preference does not correspond to the user's intentions.

In one or more embodiments of the invention, the UI module (138) may provide an indicator displaying the extent to which search criteria (110) are being modified. Further, the UI module (138) may show the modified search criteria (118) and the differences between the modified search criteria (118) and the search criteria (110) and provide the user with an option to further modify the modified search criteria (118) after the search preference is applied to the search criteria (110). The UI module (138) may also provide an option for the user to identify how relevant a search was once the search is completed and the search results are provided.

Figure 3:
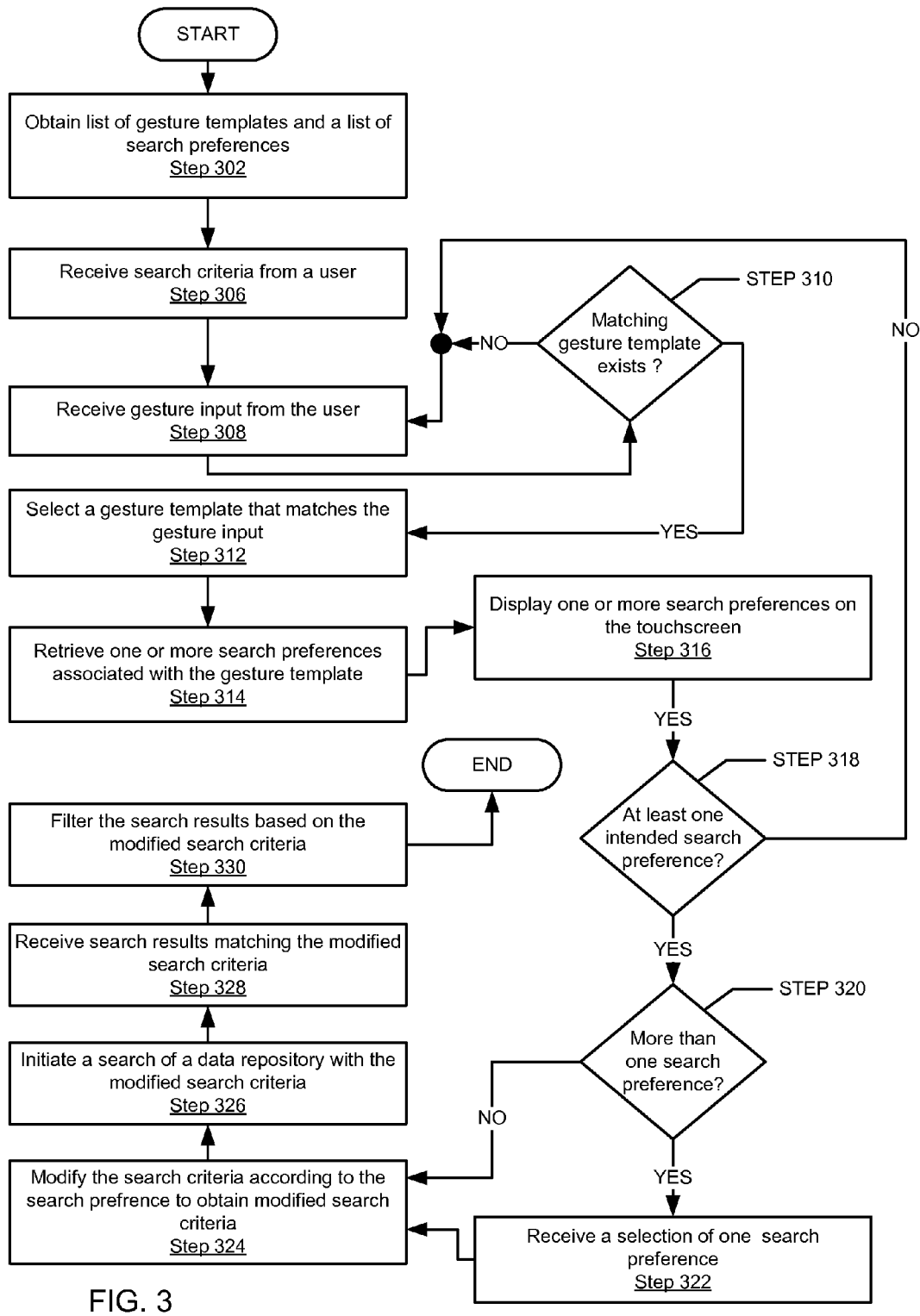
FIG. 3 shows a flowchart in accordance with one or more embodiments of the invention.

FIG. 3 shows a flowchart in accordance with one or more embodiments of the invention. The process shown in FIG. 3 may be used, for example, by a system (100) to modify search criteria (e.g., 110 in FIG. 2) and initiate a search of a data repository (e.g., 170 in FIG. 2). Further, the process shown in FIG. 3 may be implemented using one or more components of the system (100) and may perform the steps of a gesture search application (e.g., 130 in FIG. 2) executing on the system (100). Those skilled in the art, having the benefit of this detailed description, will appreciate that the sequence of steps shown in FIG. 3 may differ among embodiments of the invention, and that one or more of the steps shown in FIG. 3 may be repeated or omitted. Further, those skilled in the art, having the benefit of this detailed description, will appreciate that although the steps in FIG. 3 are shown occurring sequentially, some of the steps shown in FIG. 3 may occur in parallel with other steps in FIG. 3.

Initially, before entering search criteria, a list of gesture templates and a list of search preferences are obtained (STEP 302). The list of gesture templates and/or the list of search preferences may be downloaded from any of the sources described above. For example, a user of a touchscreen mobile phone may download and/or purchase an application from an application store that contains predefined gesture templates and/or search preferences that can be used for modifying search criteria. Those skilled in the art will appreciate that a list of gesture templates and a list of search preferences may refer to multiple gesture templates and multiple search preferences that can be stored in any suitable data structure (e.g., list, array, hash table, etc.) on any storage (e.g., magnetic drive, flash disk, and other devices capable of storing data) on the touchscreen device or on an external server.

The user may also create a list of gesture templates and/or a list of search preferences by inputting gesture templates or programming search preferences into the touchscreen device. In one or more embodiments of the invention, this process may occur via a downloaded application that facilitates the creation of gesture templates and search preferences. In one or more embodiments of the invention, the user may modify the gesture templates and the search preferences instead of creating them. Such an application may also provide templates or instructions (e.g., wizards, data classes, header files, fill-in-the-blank code files, etc.) that can further facilitate the process for creating gesture templates and search preferences.

In STEP 306, the user enters search criteria into the touchscreen device. The user may do this with any input device or method (e.g., physical keyboard on the touchscreen device or external to the touchscreen device, touchscreen keyboard on the touchscreen device, a mouse, voice recognition system, a camera, a gesture drawn on the touchscreen, and any other input method or input device). The search criteria may include any of the criteria discussed above in reference to FIG. 1 and FIG. 2. In order to input the search criteria, the user may first start a search application. Alternatively, the user may receive a prompt to enter search criteria. Still alternatively, the search application may run in the background and the user may input the search criteria while on the home screen or any other screen of the touchscreen device.

In STEP 308, the user enters a gesture input by interacting with the touchscreen of the touchscreen device (e.g., touching the touchscreen to make a gesture). The gesture input may be any of the gesture inputs or gestures described above. As discussed above, in order to enter the gesture input, the user may first start a search application or wait for a prompt to enter a gesture input. Alternatively, the user may enter the gesture input at any time the touchscreen device is turned on. Those skilled in the art will appreciate that STEP 308 may precede STEP 306 (i.e., the gesture input may be inputted before the search criteria are inputted). In one or more embodiments of the invention, entering the gesture input may trigger the search application to start-up or may trigger a prompt to enter the search criteria.

In STEP 310, the gesture input is checked against available gesture templates stored either on the touchscreen device or on any external storage in order to check if a matching gesture template exists. If a matching gesture template exists, the process proceeds to STEP 312. Otherwise, if a matching gesture template does not exist or cannot be retrieved, the process returns to STEP 308. In one or more embodiments of the invention, if a gesture template is not retrieved, the process may still proceed to STEP 312 and a default gesture template and/or a default search preference (e.g., one that does not modify the search criteria) may be selected.

In STEP 312, the matching gesture template is selected. In one or more embodiments of the invention, more than one gesture template is selected. If more than one gesture template is selected, the user may be provided with a prompt on the touchscreen to select one gesture template. Alternatively, the process may proceed to STEP 314 with multiple selected gesture templates.

In STEP 314, the process retrieves one or more search preferences associated with the gesture template from storage on the touchscreen device or storage external to the touchscreen device. The process then proceeds to STEP 316. In STEP 316, the retrieved search preferences are displayed on the touchscreen. In addition, in STEP 316 an indicator may be displayed that shows the user the extent to which the one or more search preferences may modify the search criteria.

In STEP 318, a prompt is issued to confirm the retrieved search preferences displayed on the touchscreen are the user's intended search preferences (i.e., that these search preferences modify the search criteria and filter the search results as the user intends). The prompt may display a summary of how the search preferences may change the search results or the prompt may directly show the modified search criteria after the search preferences are applied to the search criteria. If at least one search preference is an intended search preference, the process proceeds to STEP 320. If none of the search preferences that are displayed are intended, the process returns to STEP 308. The process may alternatively return to STEP 306 or terminate altogether if the user identifies that none of the search preferences are intended.

In STEP 320, it is determined whether if multiple search preferences were selected by the process in STEP 314. If multiple search preferences were selected, the process proceeds to STEP 322. Otherwise, if only one search preference was selected, the process proceeds directly to STEP 324. In STEP 322, the user selects one search preferences out of the multiple search preferences selected in STEP 314 and the process proceeds to STEP 324. In one or more embodiments of the invention, the user may still select more than one search preference and the process in the following steps will merge the multiple search preferences to appropriately modify the search criteria. In one or more embodiments of the invention, the user is provided with an option to further modify and/or customize the search preferences and the resulting modified search criteria after the search preferences and the resulting search criteria have been displayed on the touchscreen (e.g., by using pull-down menus, buttons, scroll bards, etc.).

In STEP 324, the search criteria entered by the user are modified based on the search preference that is selected in order to obtain modified search criteria. The search preferences may modify any of the criteria of the search criteria as discussed above. In STEP 326, the search is initiated using the modified step criteria. As discussed above, the search may be initiated by an application running on the touchscreen device or the modified search criteria may be sent to another server (e.g., a search engine) where the search is initiated and performed. In STEP 328, the search results are received by the touchscreen device and may be displayed to the user. Alternatively, the search results may be further filtered by the modified search criteria (STEP 330) before being displayed to the user. In one or more embodiments of the invention, the search in STEP 326 is initiated with the original search criteria entered in STEP 306 and the search results may be subsequently filtered by the modified search criteria in STEP 330 prior to being displayed on the touchscreen to the user. In other words, the search is modified by filtering the search results rather than modifying the search criteria used to perform the search.

In one or more embodiments of the invention, upon receiving a search criteria or at any other time the touchscreen device is turned on, the process in FIG. 3 first performs a search with the original search criteria entered in STEP 306 to obtain a set of initial search results. The process in FIG. 3. then parses the initial search results to identify similar terms, synonyms, and other useful data items and store them for later use when the search criteria needs to be modified. In this way, the process in FIG. 3 may identify and learn (e.g., using machine learning algorithms) what modifications can be applied to the search criteria to retrieve more relevant search results. In one or more embodiments of the invention, the process in FIG. 3 may monitor how a user interacts with search results (e.g., using machine learning algorithms) and subsequently adjust the search preferences (i.e., how the search preferences modify the search criteria) to make the search results more relevant to the user or to make the search results more complete. For example, if the user ignores most of the search results, the corresponding search preferences may include instructions to narrow the search further by accordingly modifying the search criteria.

In one or more embodiments of the invention, the user may be given an option to provide feedback (e.g., using the UI module (138) discussed above) on how relevant the search results are and the process in FIG. 3 may make appropriate adjustments (e.g., adjust the gesture templates and/or the search preferences to broaden or narrow the searches). For example, process in FIG. 3 may monitor gesture inputs from a user (e.g., using machine learning algorithms) to appropriately adjust the gesture templates so that the gesture inputs are better recognized. More specifically, if the user touches the touchscreen with two fingers simultaneously, but the appropriate gesture template is not selected, the user may provide feedback that the proper gesture template was not selected, and the process in FIG. 3 may modify the corresponding gesture template or how the gesture input is processed (e.g., by adjusting a matching threshold, changing the sensitivity of the touchscreen, and other adjustment methods) so that next time the same gesture input is received the corresponding gesture template may be correctly selected. In one or more embodiments of the invention, STEP 310 and STEP 312 (i.e., the matching of a gesture input to a gesture template) may be performed by another process or application (e.g. operating system of the touchscreen device, third party application running on the touchscreen device, a web service, etc.) and the process in FIG. 3 may receive the matched gesture template directly as input.

In other words, the process of FIG. 3 may be performed without using a list of gesture templates and any steps involving the processing of gesture templates (i.e., STEP 302, STEP 304, STEP 310, and STEP 312) may be omitted. In one or more embodiments of the invention, any of the matching or selecting steps described above (e.g., matching the gesture input to a gesture template or selecting the appropriate search preference) may depend on contextual information (e.g., state of the touchscreen device, executing environment of the touchscreen device, interface options of the touchscreen device, GPS coordinates of the touchscreen device, physical orientation of the touchscreen device, menu options of the touchscreen device, environmental conditions of the touchscreen device, and other contextual information). For example, a different search preference may be selected for the same gesture input and the same matched gesture template when the user is at home (e.g., detected by a GPS on the touchscreen device) than when the user is at work.

As discussed above, a user who is not familiar with search query languages or even simplified versions of search query languages often used in commercial search engines or in database software applications may find the gesture search application useful as the gesture search application may appropriately modify the broadness and relevance of a search based on a gesture performed on the touchscreen. A user that receives too many or too few search results may quickly redo the search with an appropriate adjustment in broadness with a simple gesture, rather than manually modifying search criteria. Consequently, the user may save time and enjoy an improved user experience when performing searches.

Figure 4A:
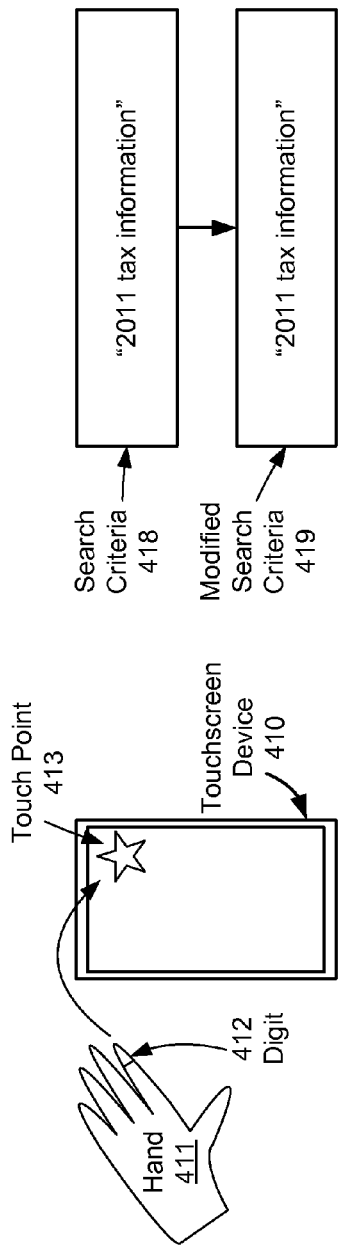
Figure 4B:
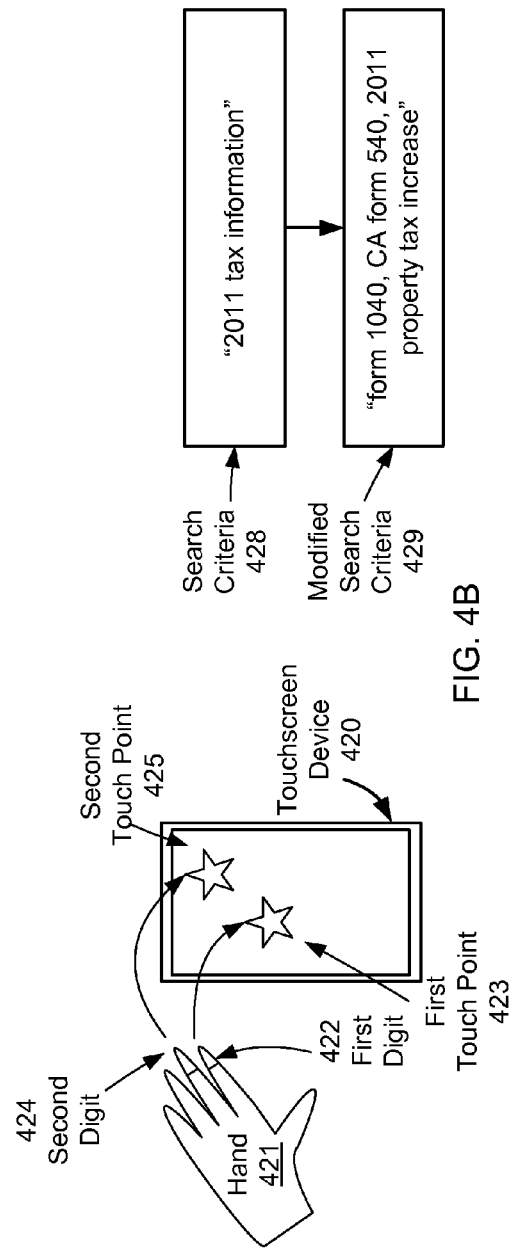

FIGS. 4A and 4B show examples in accordance with one or more embodiments of the invention. The example processes shown in FIGS. 4A and 4B may be used with a touchscreen device to accept search criteria and a gesture, and modify the search criteria based on the gesture prior to performing a search using modified search criteria. Those skilled in the art will appreciate that the sequence of steps shown in FIGS. 4A and 4B may differ among embodiments of the invention, and that one or more of the steps may be optional.

FIG. 4A shows a process of modifying search criteria (418) entered by a user in response to a gesture the user makes on a touchscreen of the touchscreen device (410). This process of modifying the search criteria (418) may occur as part of the process described in FIG. 3. The user touches the touchscreen of touchscreen device (410) at a touch point (413) with a single digit (412) from the user's hand (411). A touch of the touchscreen with the digit (412) is a gesture that may be converted into tactile information that is stored in digital format on the touchscreen device (410). The tactile information may be matched to a gesture command also stored on the touchscreen device (410) and the gesture command may be used to select a search preference that may modify the search criteria (418), which include the search terms "2011 tax information". In this case, the search criteria (418) are not modified as a result of the inputted gesture composed of a touch with one digit (412). Consequently, the modified search criteria (419) are the same as the search criteria (418) (i.e., the modified search criteria (419) also include the search terms "2011 tax information"). Those skilled in the art will appreciate that the same gesture used in this example may be associated with a different gesture command and/or a different search preference that results in a modification of the search criteria (418).

FIG. 4B shows a process of modifying search criteria (428) entered by a user in response to a gesture the user makes on a touchscreen of the touchscreen device (420). This process of modifying the search criteria (428) may occur as part of the process described in FIG. 3. The user touches the touchscreen of touchscreen device (420) at a first touch point (423) with a first digit (422) and at a second touch point (425) with a second digit (424) from the user's hand (421). The touch with the two digits (i.e., first digit (422) and second digit (424)) may be simultaneous (i.e., occurring essentially at the same time) or may include a time interval between the two touches. A touch of the touchscreen with the two digits (i.e., first digit (422) and second digit (424)) is a gesture that may be converted into tactile information that is stored in digital format on the touchscreen device (420). The tactile information may be matched to a gesture command also stored on the touchscreen device (420) and the gesture command may be further used to select a search preference that may modify the search criteria (428), which include the search terms "2011 tax information". In this case, the search criteria (428) are modified to "form 1040, CA form 540, 2011 property tax increase" (i.e., modified search criteria (429)). The particular modification may be based on contextual information about the user. For example, user information (e.g., tax information) may be accessed (e.g., by software running on the touchscreen device (420)) that includes a user's income level, residence address, and mortgage information. Based on this user information, search terms in the search criteria (428) may be appropriately modified to only include search terms relevant to the user. In this case, search terms may be limited to tax information relevant to the user (e.g., the custom search terms may include the 1040 tax form based on the income level of the user exceeding a certain amount, the custom search terms may include California tax forms based on the user residing in California, and the custom search terms may include information regarding a property tax increase based on the user paying a property tax in a previous year). Alternatively, the modifications to the search criteria (428) may originate from other sources (e.g., instructions preprogrammed into the touchscreen device (420), based on the user's social network, and any other reasons). Those skilled in the art will appreciate that the same gesture used in this example may be associated with a different gesture command and/or a different search preference that results in a different modification to the search criteria (428).

FIGS. 5A and 5B show examples in accordance with one or more embodiments of the invention. The processes shown in FIGS. 5A and 5B may be used, for example, with a touchscreen device to accept search criteria and a gesture, and modify the search criteria based on the gesture. Those skilled in the art will appreciate that the sequence of steps shown in FIGS. 5A and 5B may differ among embodiments of the invention, and that one or more of the steps may be optional.

FIG. 5A shows a process of modifying search criteria (518) entered by a user in response to a gesture the user makes on a touchscreen of the touchscreen device (510). This process of modifying the search criteria (518) may occur as part of the process described in FIG. 3. The user touches the touchscreen of touchscreen device (510) at a first touch point (513) with a first digit (512) and at a second touch point (515) with a second digit (514) from the user's hand (511). The user also slides the second digit (514) along a movement path (516) on the touchscreen (i.e., the user traces a vector on the touchscreen). A touch of the touchscreen with the two digits (i.e., first digit (512) and second digit (514)) and the sliding action of the second digit (514) along a movement path (516) is a gesture that may be converted into tactile information that is stored in digital format on the touchscreen device (510). The tactile information may be matched to a gesture command also stored on the touchscreen device (510) and the gesture command may be further used to select a search preference that modifies the search criteria (518).

The touchscreen of the touchscreen device (510) may also display an indicator UI (517) that displays the modifications to the search criteria (518) and/or the extent of the modifications to the search criteria (518) (i.e., how broader or narrower the resulting search will be with the modified search criteria (519) than with the search criteria (518)), which may depend on the length of the movement path (516) (i.e., the distance the second digit (514) is moved along the touchscreen) and the direction of the movement path (516). The search criteria (518) in this example are used to search for a person and thus include several person identifying fields (i.e., occupation, specialty, location, and fee range). Those skilled in the art will appreciate that many more fields and criteria for identifying and searching for a person exist and may be applied to this example. In this example, as a result of the movement path (516) existing but being relatively short, the search criteria (518) are modified only slightly. Specifically, the search is broadened by including alternative terms to the "occupation" field in the search criteria (518) (i.e., "lawyer" is converted to "lawyer OR attorney") and the "specialty" field in the search criteria (518) (i.e., "patent" is converted to "patent OR IP"). The particular modification may be based on a look up of a database storing similar terms and synonyms of English words or may be dynamically generated by first performing a search using the original search criteria (518) and learning what other terms may be included. Those skilled in the art will appreciate that the same gesture used in this example may be associated with a different gesture command and/or a different search preference that results in a different modification to the search criteria (518).

FIG. 5B shows a process of modifying search criteria (528) entered by a user as a result of a gesture the user makes on a touchscreen of the touchscreen device (520). This process of modifying the search criteria (528) may occur as part of the process described in FIG. 3. The user touches the touchscreen of touchscreen device (520) at a first touch point (523) with a first digit (522) and at a second touch point (525) with a second digit (524) from the user's hand (521). The user also slides the second digit (524) along a movement path (526) on the touchscreen. A touch of the touchscreen with the two digits (i.e., first digit (522) and second digit (524)) and the sliding action of the second digit (524) along a movement path (526) is a gesture that may be converted into tactile information that is stored in digital format on the touchscreen device (520). The tactile information may be matched to a gesture command also stored on the touchscreen device (520) and the gesture command may be further used to select a search preference that may modify the search criteria (528). The touchscreen of the touchscreen device (520) may also display an indicator UI (527) displaying the modifications to the search criteria (528) and/or the extent of the modifications to the search criteria (528) (i.e., how broader or narrower the resulting search will be with the modified search criteria (529) than with the search criteria (528)), which may depend on the length of the movement path (526) (i.e., the distance the second digit (524) is moved along the touchscreen) and the direction of the movement path (526). The search criteria (528) in this example are used to search for a person and thus include several person identifying fields (i.e., occupation, specialty, location, and fee range). Those skilled in the art will appreciate that many more fields and criteria for identifying and searching for a person exist and may be applied to this example. In this example, as a result of the movement path (526) being longer than the movement path (516) in FIG. 5A, the search criteria (528) are modified significantly and more so than the search criteria (518) in FIG. 5A. As in FIG. 5A, the search is broadened by including alternative terms to the "occupation" field in the search criteria (528) (i.e., "lawyer" is converted to "lawyer OR attorney") and the "specialty" field in the search criteria (528) (i.e., "patent" is converted to "patent OR IP"). However, in addition, the search is furthered broadened by modifying the "location" and "fee range" fields. Specifically, "location" is modified from "San Jose, Calif." to "Santa Clara County, CA", thereby resulting in broader search as Santa Clara County includes San Jose and several other cities and regions. Further, "fee range" is extended from "$100-$200" to "$100-$400", and therefore the search includes patent attorneys or lawyers than charge higher prices or have higher billing rates, also effectively broadening the search. The above-discussed modifications may be based on any search preferences discussed above. Those skilled in the art will appreciate that the same gesture used in this example may be associated with a different gesture command and/or a different search preference that results in a different modification to the search criteria (528).

Figure 6:
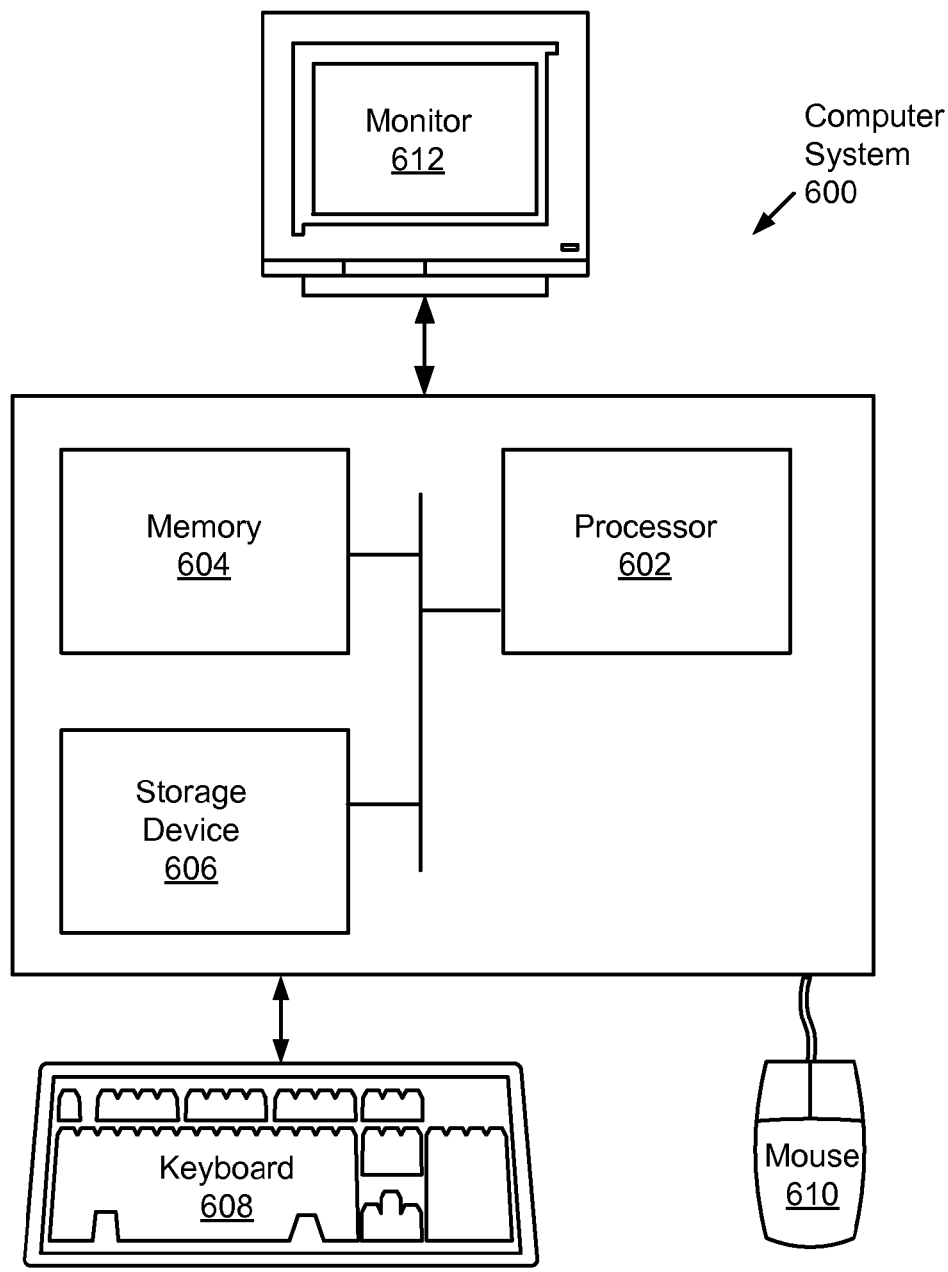
FIG. 6 shows a computer system in accordance with one or more embodiments of the invention.

FIG. 6 shows a computer system (600) in accordance with one or more embodiments of the invention. As shown in FIG. 6, the computer system (600) includes a processor (602) such as an integrated circuit, central processing unit, or other hardware processor, associated memory (604), a storage device (606), and numerous other elements and functionalities typical of today's computers (not shown). The computer system (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system (600) may be located at a remote location and connected to the other elements over a network. Further, software instructions to perform embodiments of the invention may be stored on a non-transitory computer readable storage medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for searching using a touchscreen, comprising:
    downloading a plurality of gesture templates and a plurality of search preferences;
    receiving, from a user, a plurality of search criteria including a numerical range;
    receiving, using the touchscreen, a gesture input from the user comprising a first digit of the user sliding a distance and a direction relative to a second digit of the user on the touchscreen;
    matching the gesture input to a gesture template of the plurality of gesture templates;
    retrieving a search preference of the plurality of search preferences associated with the gesture template,
        wherein the search preference corresponds to the numerical range in the plurality of search criteria, and
        wherein the search preference is used to modify the plurality of search criteria by adjusting a scope of the plurality of search criteria;
    obtaining a plurality of modified search criteria by modifying the plurality of search criteria, wherein modifying the plurality of search criteria comprises changing, based on the search preference, the numerical range according to the distance and direction;
    updating an indicator user interface displayed on the touchscreen based on the distance and the direction; and
    generating a plurality of search results based on the plurality of modified search criteria from a data repository.

2. The method of claim 1, wherein generating the plurality of search results comprises:
    retrieving the plurality of search results by searching the data repository using the plurality of search criteria; and
    filtering the plurality of search results based on the plurality of modified search criteria.

3. The method of claim 1, wherein modifying the plurality of search criteria further comprises:
    selecting a term within the plurality of search criteria; and
    adding a similar term selected from a group consisting of a synonym of the term, a morphological form of the term, and a misspelling of the term to the plurality of search criteria.

4. The method of claim 1, wherein modifying the plurality of search criteria further comprises:
    removing a subset of a plurality of terms from the plurality of search criteria.

5. The method of claim 1, wherein modifying the plurality of search criteria further comprises:
    restricting a search to a portion of the data repository.

6. The method of claim 1, wherein modifying the plurality of search criteria further comprises:
    limiting a search to one selected from a group consisting of a search history of the user and preferences of other users in a social network of the user.

7. The method of claim 1, wherein the plurality of search criteria identifies a location, and wherein the plurality of modified search criteria identifies a region comprising location.

8. The method of claim 1, wherein the plurality of search criteria identifies a characteristic of a first business, wherein modifying the plurality of search criteria further comprises adding a characteristic of a second business to the plurality of search criteria, and wherein the first business and the second business share a common characteristic selected from a group consisting of an industry, a business name, a location, a number of employees, a revenue, a profit, a market capital, a business type, and a business strategy.

9. The method of claim 1, wherein the plurality of search criteria identifies a characteristic of a first product, wherein modifying the plurality of search criteria further comprises adding a characteristic of a second product to the plurality of search criteria, and wherein the first product and the second product share a common characteristic selected from a group consisting of a product function, a service type, a cost, and a brand.

10. A non-transitory computer readable storage medium comprising instructions for searching using a touchscreen, the instructions comprising functionality for:
    downloading a plurality of gesture templates and a plurality of search preferences;
    receiving, from a user, a plurality of search criteria including a numerical range;
    receiving, using the touchscreen, a gesture input from the user comprising a first digit of the user sliding a distance and a direction relative to a second digit of the user on the touchscreen;
    matching the gesture input to a gesture template of the plurality of gesture templates;
    retrieving a search preference of the plurality of search preferences associated with the gesture template,
        wherein the search preference corresponds to the numerical range in the plurality of search criteria, and
        wherein the search preference is used to modify the plurality of search criteria by adjusting a scope of the plurality of search criteria;
    obtaining a plurality of modified search criteria by modifying the plurality of search criteria, wherein modifying the plurality of search criteria comprises changing, based on the search preference, the numerical range according to the distance and direction;
    updating an indicator user interface displayed on the touchscreen based on the distance and the direction; and
    generating a plurality of search results based on the plurality of modified search criteria from a data repository.

11. The non-transitory computer readable storage medium of claim 10, wherein the instructions for generating the plurality of search results comprise functionality for:
    retrieving the plurality of search results by searching the data repository using the plurality of search criteria; and
    filtering the plurality of search results based on the plurality of modified search criteria.

12. A system for searching based on a plurality of search criteria including a numerical range, comprising:
    a storage unit storing a plurality of gesture template and a plurality of search preferences;
    a touchscreen configured to obtain a gesture input from a user comprising a first digit of the user sliding a distance and a direction relative to a second digit of the user on the touchscreen;
    a gesture mapping module configured to:
        match the gesture input to a gesture template of the plurality of gesture templates; and
        retrieve a search preference of the plurality of search preferences associated with the gesture template,
            wherein the search preference corresponds to the numerical range in the plurality of search criteria, and
            wherein the search preference is used to modify the plurality of search criteria by adjusting a scope of the plurality of search criteria;

a search criteria modification module configured to generate a plurality of modified search criteria by modifying the plurality of search criteria, wherein modifying the plurality of search criteria comprises changing, based on the search preference, the numerical range according to the distance and the direction;

an indicator user interface displayed on the touchscreen and updated based on the distance and the direction; and a search module configured to generate a plurality of search results based on the plurality of modified search criteria from a data repository.

13. The system of claim 12, wherein the search module is further configured to:

retrieve the plurality of search results by searching the data repository using the plurality of search criteria; and filter the plurality of search results based on the plurality of modified search criteria.

* * * * *